(No Model.)
H. F. STAHMER.
TWO WHEELED VEHICLE.
No. 271,532. Patented Jan. 30, 1883.
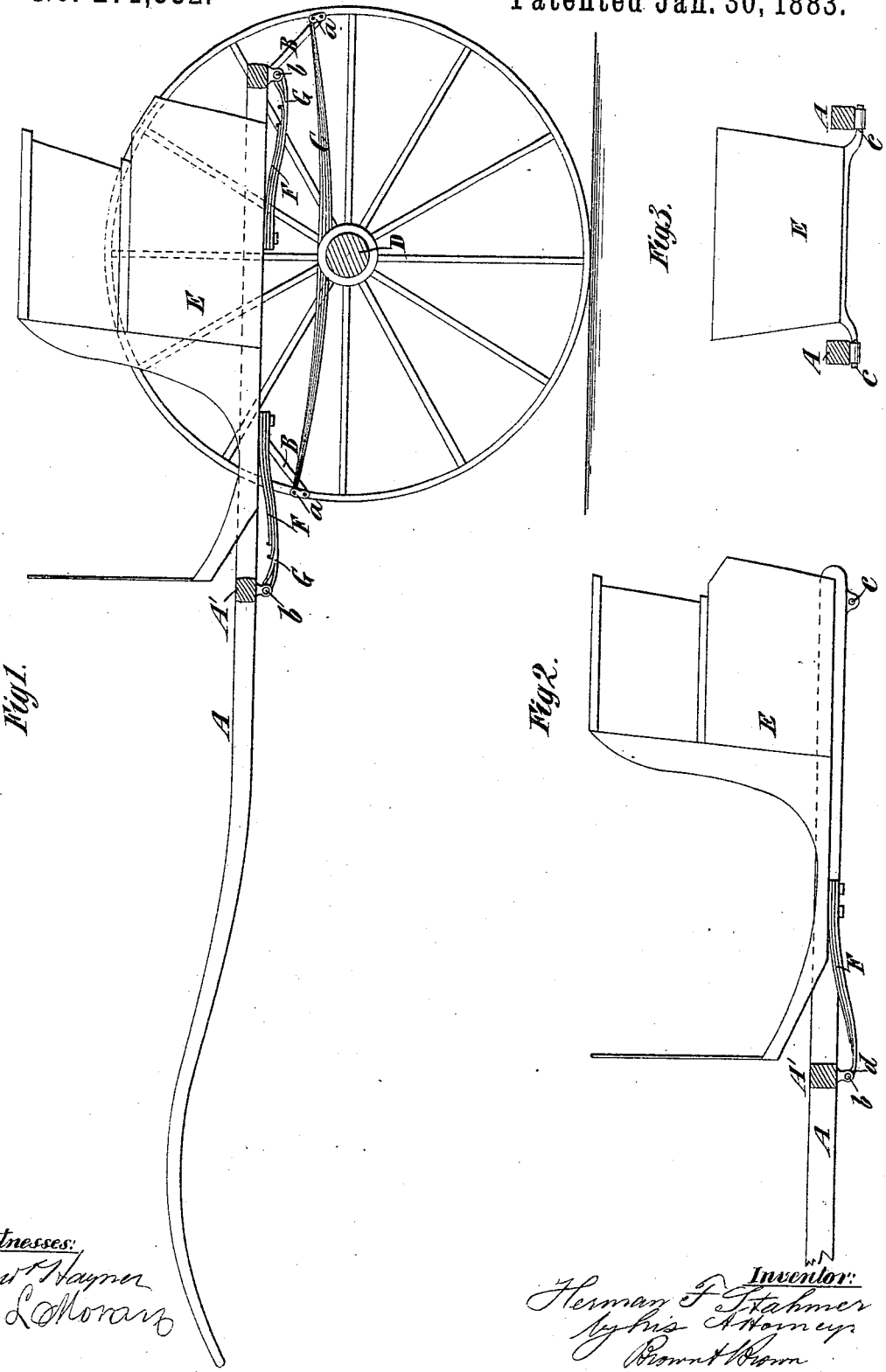

UNITED STATES PATENT OFFICE.

HERMAN F. STAHMER, OF NEW YORK, N. Y., ASSIGNOR OF ONE-HALF TO HENRY BREWSTER, JOHN W. BRITTON, AND CHANNING M. BRITTON, OF SAME PLACE.

TWO-WHEELED VEHICLE.

SPECIFICATION forming part of Letters Patent No. 271,532, dated January 30, 1883.

Application filed June 19, 1882. (No model.)

*To all whom it may concern:*

Be it known that I, HERMAN F. STAHMER, of the city and county of New York, in the State of New York, have invented a certain new and useful Improvement in Vehicles, of which the following is a specification.

My invention relates to two-wheeled vehicles—such as dog-carts, gigs, &c.; and the object of the invention is to compensate for the knee action of the horse.

My invention consists in the combination, with the axle of a two-wheeled vehicle, of shafts extending over and beyond the axle, springs mounted on the axle and connected at one end to the shafts considerably forward of the axle and connected at the other end to the shafts considerably in rear of the axle, yielding connections between the rear portion of the body and adjacent portions of the shafts, and springs connecting the forward portion of the body to the adjacent portions of the shafts, as more fully hereinafter described.

In the accompanying drawings, Figure 1 represents a sectional elevation of a vehicle embodying my invention, in which the body is connected with the shafts by springs at the back and front ends. Fig. 2 represents an elevation of the body and shafts of a vehicle, also embodying my invention, in which the body is pivoted to the shafts; and Fig. 3 represents an end view of the body of the vehicle shown in Fig. 2 and a transverse section of the shafts.

Similar letters of reference designate corresponding parts in all the figures.

Referring first to Fig. 1, A designates the shafts of the vehicle, which are provided with rigid stays or arms B, connected to the ends of the springs C by shackles *a* or otherwise, and the springs are supported on the axle D in a well-known manner.

E designates the body of the vehicle, which is supported at its front end by two springs, F, one upon each side, and at its back end by two similar springs, F', one upon each side, all of which extend lengthwise of the body. The shafts A extend rearward over and considerably beyond the axle D.

It will be observed that the points of connection between the ends of the springs C and the shafts are at a considerable distance from the axle forward and rearward, and the springs C therefore offer a resistance to the swinging movements of the shafts upward and downward, and less movement is imparted to the body from the shafts than would be the case if ordinary elliptic springs connected to the shafts at one point directly over the axle were used to support the shafts.

Each spring F F' is composed of a suitable number of leaves bolted to the under side of the body and free at their opposite ends, and the springs are each connected with the shaft A by a leather brace, G, which is passed around a pin, *b*, on the cross-bars A' of the shafts, and the ends of said braces are bolted fast to the body with the leaf-springs F F'. The springs F F', instead of being connected with the shafts by the leather brace, might be connected therewith by shackles, eyes, or other means in any suitable manner. The back springs, F', form yielding connections between the body and the shafts, and as the horse trots the springs F allow the body to rise and fall at the front end relatively to the shafts and compensate for the knee action of the horse, thus producing a very easy-riding vehicle.

In Figs. 2 and 3 I have represented the yielding connections between the back of the body E and the shafts A as formed by pivots *c*, and the front end of the body is supported by leaf-springs F, like those before described, except that instead of having a leather brace-connection between the springs and shafts I make the connections by an eye, *d*, on the spring fitting the pin *b*, or by a shackle. The body can swing slightly on the pivots *c* at the back end, and the springs F allow the body to rise and fall freely at the front end relatively to the shafts.

By my invention I compensate for the knee action of the horse in a simple and very effective manner and render dog-carts, gigs, and analogous two-wheeled vehicles more easy and agreeable to persons riding in them.

Many important advantages result from making the springs F' entirely separate from the springs F, instead of having two long springs extending under the body at each side and connected with the shafts in front of and behind the body, as has been done heretofore. Where separate springs are used at the back and front, they may be made much lighter than where two springs only are used, and are therefore much cheaper. If one of the short springs break, it can be replaced at a much less cost than could a long spring, and the short springs, of any uniform length, can be applied to any vehicle, no matter what is the length of the body, while if the body is supported on two springs which extend the full length thereof they must be made of a length specially to fit the vehicle.

What I claim as my invention, and desire to secure by Letters Patent, is—

In a two-wheeled vehicle, the combination, with the axle, of shafts extending over and beyond the axle, springs mounted on the axle and connected at one end to the shafts considerably forward of the axle and connected at the other end to the shafts considerably in rear of the axle, yielding connections between the rear portion of the body and adjacent portion of the shafts, and springs connecting the forward portion of the body to the adjacent portion of the shafts, substantially as and for the purpose specified.

HERMAN F. STAHMER.

Witnesses:
FREDK. HAYNES,
ED. L. MORAN.